(12) United States Patent
Carter (10) Patent No.: US 11,483,404 B2
(45) Date of Patent: Oct. 25, 2022

(54) MACRAMÉ TILE BASED MACRAMÉ APPLICATION AND METHOD OF USING THE MACRAMÉ APPLICATION

(71) Applicant: Carter Global, LLC, Las Vegas, NV (US)

(72) Inventor: John William Carter, Las Vegas, NV (US)

(73) Assignee: Carter Global, LLC, Las Vegas, NV (US)

( * ) Notice: Subject to any disclaimer, the term of this patent is extended or adjusted under 35 U.S.C. 154(b) by 0 days.

(21) Appl. No.: 17/470,921

(22) Filed: Sep. 9, 2021

(65) Prior Publication Data
US 2022/0078262 A1    Mar. 10, 2022

Related U.S. Application Data

(60) Provisional application No. 63/076,312, filed on Sep. 9, 2020.

(51) Int. Cl.
*H04L 67/00*    (2022.01)
*D04G 3/04*    (2006.01)

(52) U.S. Cl.
CPC ............ *H04L 67/34* (2013.01); *D04G 3/04* (2013.01)

(58) Field of Classification Search
CPC ................................. H04L 67/34; D04G 3/04
See application file for complete search history.

(56) References Cited

U.S. PATENT DOCUMENTS

| | | | |
|---|---|---|---|
| 8,731,703 B1* | 5/2014 | Lehrer | G06Q 30/0621 700/133 |
| 2002/0175942 A1* | 11/2002 | Seitz, Jr. | G06Q 30/02 715/764 |
| 2014/0277683 A1* | 9/2014 | Gupta | G06F 30/00 700/132 |
| 2014/0358495 A1* | 12/2014 | Belmans | G06T 17/00 703/1 |
| 2016/0349978 A1* | 12/2016 | Gonsalves | H04L 65/4015 |
| 2018/0047040 A1* | 2/2018 | Smith | B65H 75/182 |
| 2019/0382931 A1* | 12/2019 | Karmon | G06F 30/20 |
| 2020/0353678 A1* | 11/2020 | Yeoh | B33Y 10/00 |
| 2021/0337905 A1* | 11/2021 | Wilcox | G06F 30/12 |

FOREIGN PATENT DOCUMENTS

WO    WO-2018092128 A1 *    5/2018

OTHER PUBLICATIONS

Breckenridge, Sally; iWEAVEIT User Guide, 2018, Canyon Art LLC, Version 4 (Year: 2018).*

* cited by examiner

*Primary Examiner* — Blake J Rubin
(74) *Attorney, Agent, or Firm* — The Watson IP Group, PLC; Jovan N. Jovanovic (57) ABSTRACT

A method and system include a computing device. The computing device includes a network interface, to communicate with an app server, to download a macramé app from the app server. The computing device further includes a processing unit to execute the macramé app to select a plurality of macramé tiles and place the plurality of macramé tiles against each other to form a macramé project.

15 Claims, 6 Drawing Sheets

MACRAMÉ TILE BASED MACRAMÉ APPLICATION AND METHOD OF USING THE MACRAMÉ APPLICATION

CROSS-REFERENCE TO RELATED APPLICATION

This application claims priority from U.S. Prov. Pat. App. Ser. No. 63/076,312 filed Sep. 9, 2020, entitled "MACRAMÉ TILE BASED MACRAMÉ APPLICATION AND METHOD OF USING THE MACRAMÉ APPLICATION", the entire disclosure of which is hereby incorporated by reference in its entirety.

BACKGROUND OF THE DISCLOSURE

1. Field of the Disclosure

The disclosure relates in general to macramé, and more particularly, to a macramé tile based macramé application ("macramé app" or "the app") and method of using the macramé app.

2. Background Art

Forming a textile using knotting techniques, rather than weaving or knitting techniques, is called macramé. Macramé has a long history, having been long crafted by sailors, sometimes in elaborate or ornamental knotting forms to cover anything from knife handles to parts of ships. Sailors made macramé objects while not busy at sea, and sold or bartered them when they landed, spreading this art form to places like China and the New World. Nineteenth-century British and American sailors made hammocks, bell fringes, and belts from macramé. They called the process "square knotting" after the knot they used most often. Sailors also called macramé "McNamara's lace".

Macramé can be used to make wall hangings or tapestries, clothing accessories, small jean shorts, bedspreads, tablecloths, draperies, plant hangers and other furnishings. Macramé jewelry even became popular in America. Using mainly square knots and granny knots, this jewelry often features handmade glass beads and natural elements such as bone and shell. Necklaces, anklets, and bracelets have become popular forms of macramé jewelry.

Cords made of cotton twine, linen, hemp, jute, leather, or yarn can all be used for making macramé. Cords are identified by construction, such as a 3-ply cord, made of three lengths of fiber twisted together. Jewelry is often made in combination of both the knots and various beads (of glass, wood, and so on), pendants or shells. Sometimes 'found' focal points are used for necklaces, such as rings or gemstones, either wire-wrapped to allow for securing or captured in a net-like array of intertwining overhand knots. A knotting board is often used to mount the cords for macramé work, with the cords being held in place using a C-clamp, straight pins, T-pins, U-pins, or upholstery pins.

For larger decorative pieces, wall hangings, such as tapestry, and window coverings, a work of macramé might be started out on a wooden or metal dowel, allowing for a spread of dozens of cords that are easy to manipulate. For smaller projects, push-pin boards are available specifically for macramé, although a simple corkboard can be used. Beginners' kits, work boards, beads and materials ranging in price for the casual hobbyist or ambitious craftsperson can be purchased from many craft stores.

SUMMARY OF THE DISCLOSURE

The disclosure is directed to a computing device comprised of a network interface and a processing unit. The network interface communicates with an app server and downloads a macramé app from the app server. The processing unit executes the macramé app to select a plurality of macramé tiles and place the plurality of macramé tiles against each other to form a macramé project.

In some configurations of the computing device, the plurality of macramé tiles includes a plurality of cords, where at least one of the plurality of cords may be different color from a rest of the plurality of cords, the macramé app continuing the different color onto the plurality of macramé tiles.

In some configurations of the computing device, the macramé app allows a user to select the different color.

In some configurations of the computing device, the macramé project is one of a tapestry, clothing accessory, small jean shorts, bedspread, tablecloth, drapery, and plant hanger.

In some configurations of the computing device, the macramé app allows a user to replace a macramé tile from the plurality of the macramé tiles within the macramé project.

In some configurations of the computing device, the macramé tiles are diamond shaped.

In some configurations of the computing device, the macramé tiles include metadata that describes how cords enter and exit the plurality of macramé tiles.

The disclosure is also directed to a method comprising communicating, by a network interface, with an app server to download a macramé app from the app server. The method further comprises executing, by a processing unit, the macramé app to select a plurality of macramé tiles and place the plurality of macramé tiles against each other to form a macramé project.

In some configurations of the method, the plurality of macramé tiles include a plurality of cords, where one of the plurality of cords may be a different color from a rest of the plurality of cords, the macramé app continuing the different color onto the plurality of macramé tiles.

In some configurations of the method, allowing, by the macramé app, a user to select the different color.

In some configurations of the method, the macramé project is one of a tapestry, clothing accessory, small jean shorts, bedspread, tablecloth, drapery, and plant hanger.

In some configurations of the method, the method further comprises allowing, by the macramé app, a user to replace a macramé tile from the plurality of the macramé tiles within the macramé project.

In some configurations of the method, the macramé tiles are diamond shaped.

The disclosure is also directed to a system comprising an app server and a computing device. The app server stores a plurality of apps including a macramé app. The computing device includes a network interface, to communicate with an app server, to download a macramé app from the app server, and a processing unit to execute the macramé app to select a plurality of macramé tiles and place the plurality of macramé tiles against each other to form a macramé project.

In some configurations of the system, the plurality of macramé tiles include a plurality of cords, where at least one of the plurality of cords may be a different color from a rest of the plurality of cords, the macramé app continuing the different color onto the plurality of macramé tiles.

In some configurations of the system, the macramé app allows a user to select the different color.

In some configurations of the system, the macramé project is one of a tapestry, clothing accessory, small jean shorts, bedspread, tablecloth, drapery, and plant hanger.

In some configurations of the system, the macramé app allows a user to replace a macramé tile from the plurality of the macramé tiles within the macramé project.

In some configurations of the system, the macramé tiles include metadata that describes how cords enter and exit the plurality of macramé tiles.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
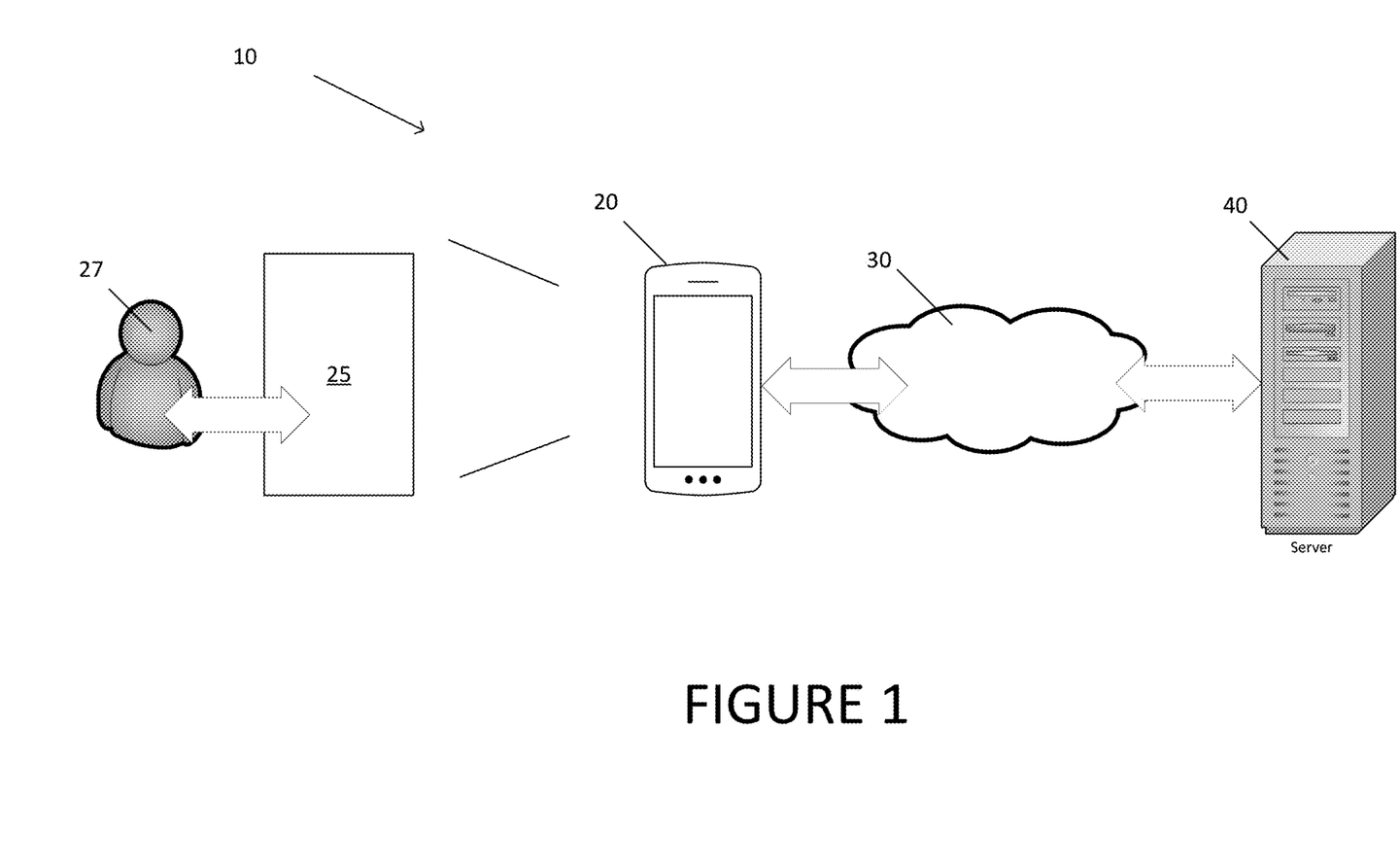
FIG. 1 illustrates an example system including an example computing device executing an example macramé app, in accordance with at least one configuration disclosed herein.

Referring now to the drawings and in particular to FIG. 1, a system is disclosed such as system 10. The system 10 can include a computing device 20, a communication network 30, and an app server 40, with the computing device 20 executing a macramé app 25 stored on the computing device 20. The computing device 20 can take the form of a smart phone, a smart display, a tablet computer, a laptop computer, a desktop computer, or any other type of device that can execute the macramé app 25. The communication network 30 can take the form of a wired, such a local area network (LAN), and/or wireless network, such as a WiFi network and/or a cellular network. The communication network 30 allows the computing device 20 to access the Internet. The app server 40 can take the form of an existing app server, such as those that support Apple's App Store or Google's Play store, or any other type of app store that is able to service the macramé app 25 disclosed herein.

When a user 27 first desires to obtain the macramé app 25 for their computing device 20, the user 27 sends a request to the app server 40 for the macramé app 25. The app server 40 responds in kind by communicating the macramé app 25 to the computing device 20. The computing device 20 then installs the macramé app 25 on the computing device 20, after which the macramé app 25 is ready to execute on the computing device 20.

Typically, a user would create a macramé project to see if they like the project or not, would find a book of macramé projects, and/or would look at macramé projects online. These sources provide plans for creating a macramé project that was already created by someone else. The macramé app 25 overcomes such deficiencies by allowing the user 27 to preview a macramé project instead created by the user 27, by formulating a virtual macramé project on the computing device 20. The macramé app 25 displays a GUI, such as the example GUIs 200-500 (FIGS. 2-5), through which the user 27 is able to design their own macramé projects, such as the example macramé projects 310-510 (FIGS. 3-5) in advance of actually physically knotting the macramé project 210. Designing the macramé projects 310-510 on the GUIs 300-500 via the macramé app 25 executing on the computing device 20 allows the user 27 to visualize what the macramé projects 310-510 would ultimately look like. In addition, the macramé app 25 allows the user 27 to select a particular cord within a macramé project, select any particular color for that particular cord, and have the macramé app 25 automatically color that particular cord as it travels through the macramé project, discussed in more detail below.

Figure 3:
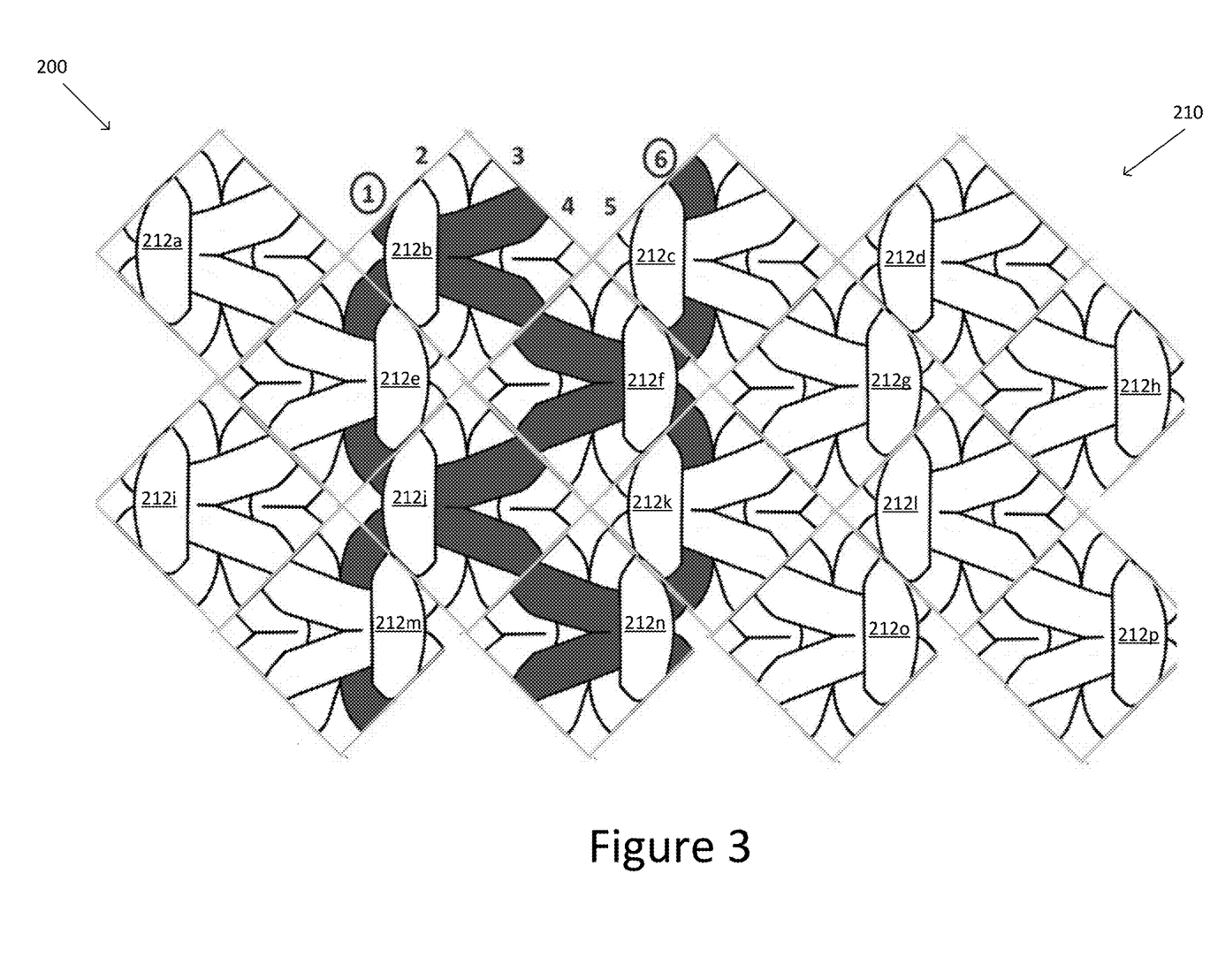
FIG. 3 illustrates another GUI showing an example macramé project, in accordance with at least one configuration disclosed herein.
Figure 4:
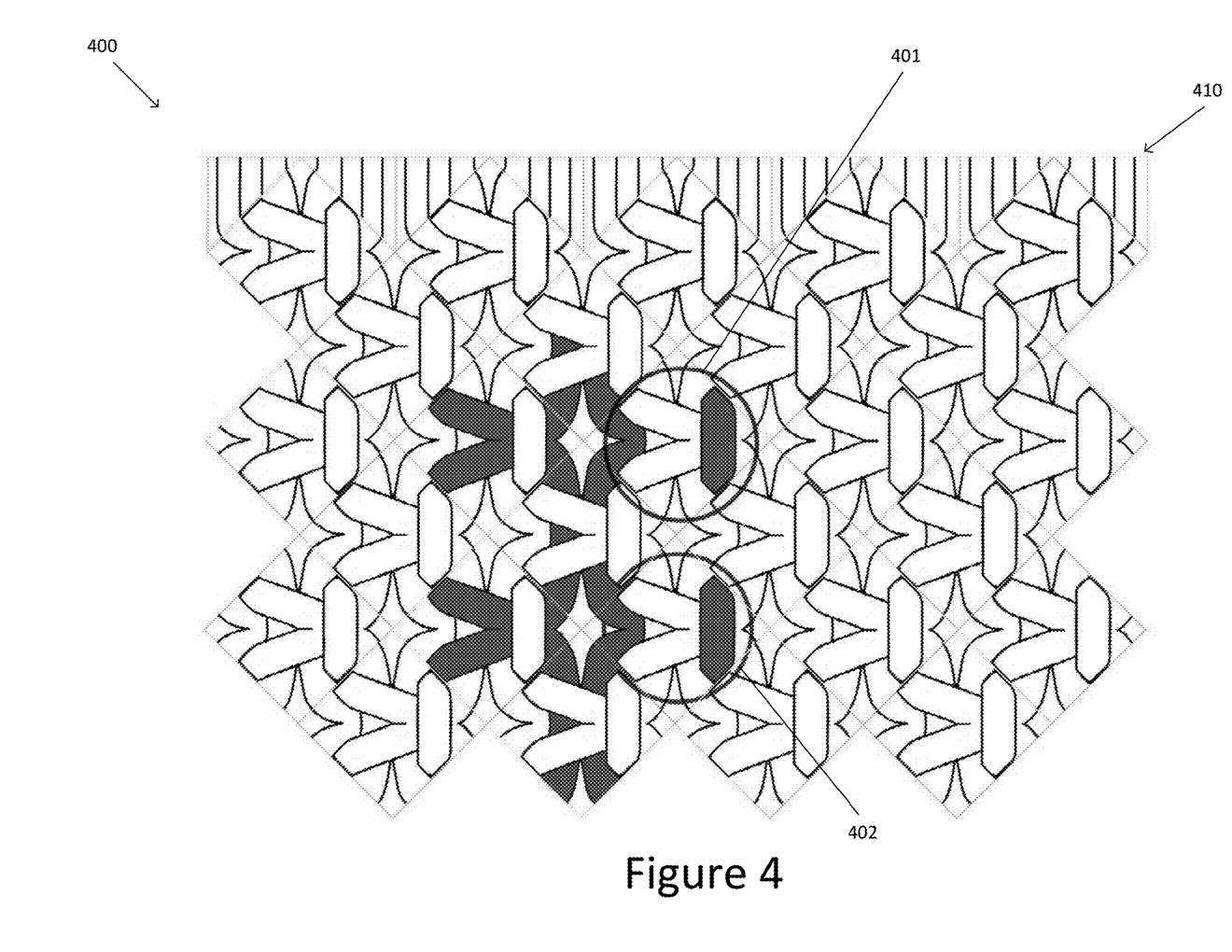
FIG. 4 illustrates yet another GUI showing another example macramé project, in accordance with at least one configuration disclosed herein.
Figure 5:
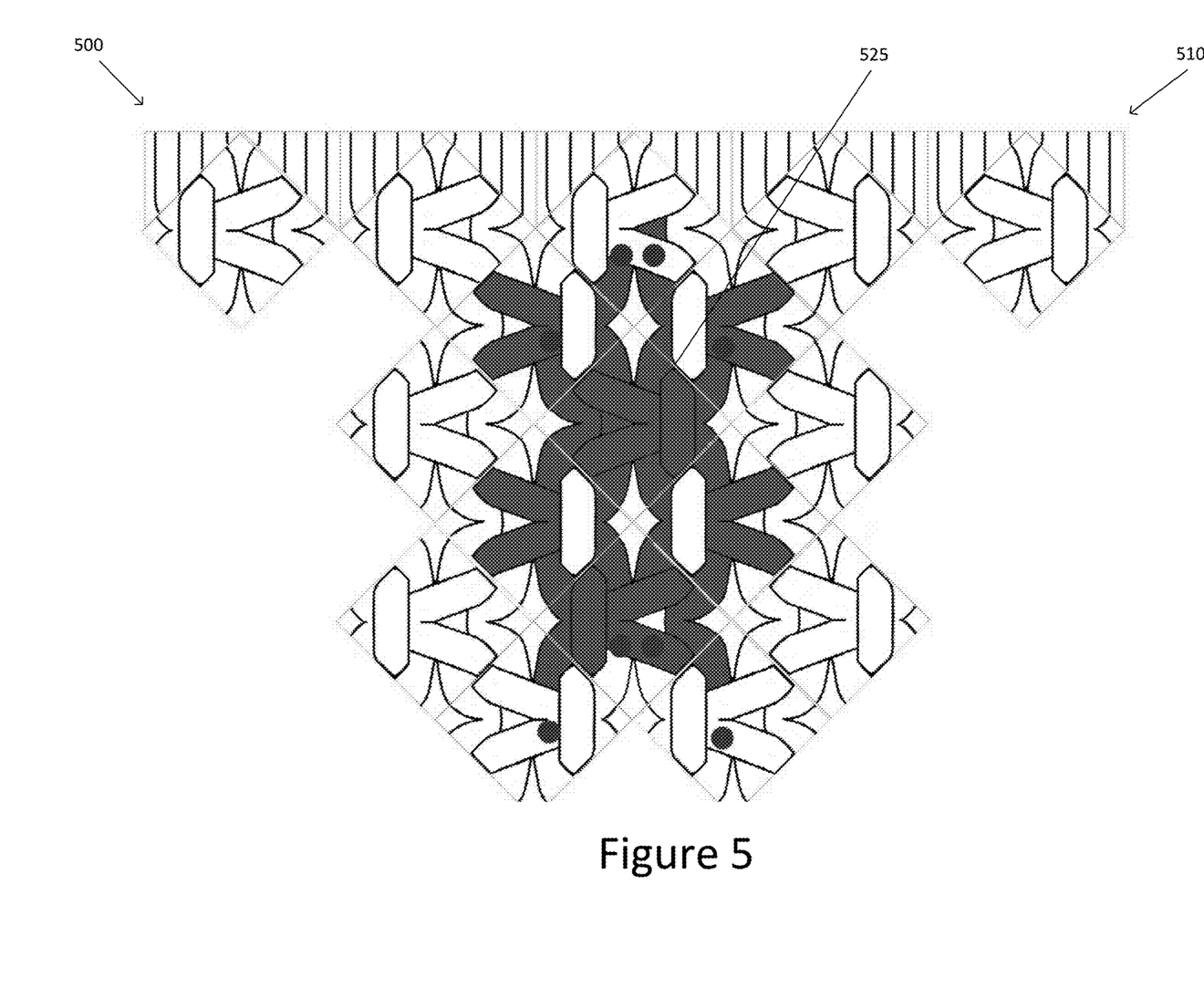
FIG. 5 illustrates even yet another GUI showing yet another example macramé project, in accordance with at least one configuration disclosed herein.

Should the user 27 not like a particular macramé project, e.g., any of the macramé projects 310-510, the user 27 can simply discard any of the macramé projects 310-510 and start over with a new macramé project. However, should the user 27 like any of the macramé projects 310-510, the user can then physically knot any of the macramé projects 310-510. Experimenting with typical macramé is a chore of potentially taking out 100's of knots to make a change to improve an appearance of a project or to incorporate a different idea and retying all the knots. Thus, the macramé app 25, via the GUI 300, saves the user 27 substantial time and potentially material cost should the user 27 not want to untie the knots, by allowing the user 27 to create a virtual macramé project and pre-evaluate this macramé project prior to physically knotting the macramé project to create a physical macramé project. Once the user 27 has created a macramé project that the user 27 would like to physically create, the macramé app 25 can provide the user 27 with an instruction set, e.g., via another GUI (not shown), that provides step-by-step instructions for physically creating the macramé project. In at least one configuration, macramé app 25 can send such step-by-step instructions to a printer (not shown) so that the user 27 can physically create the macramé project without reliance on the computing device 20.

Figure 2:
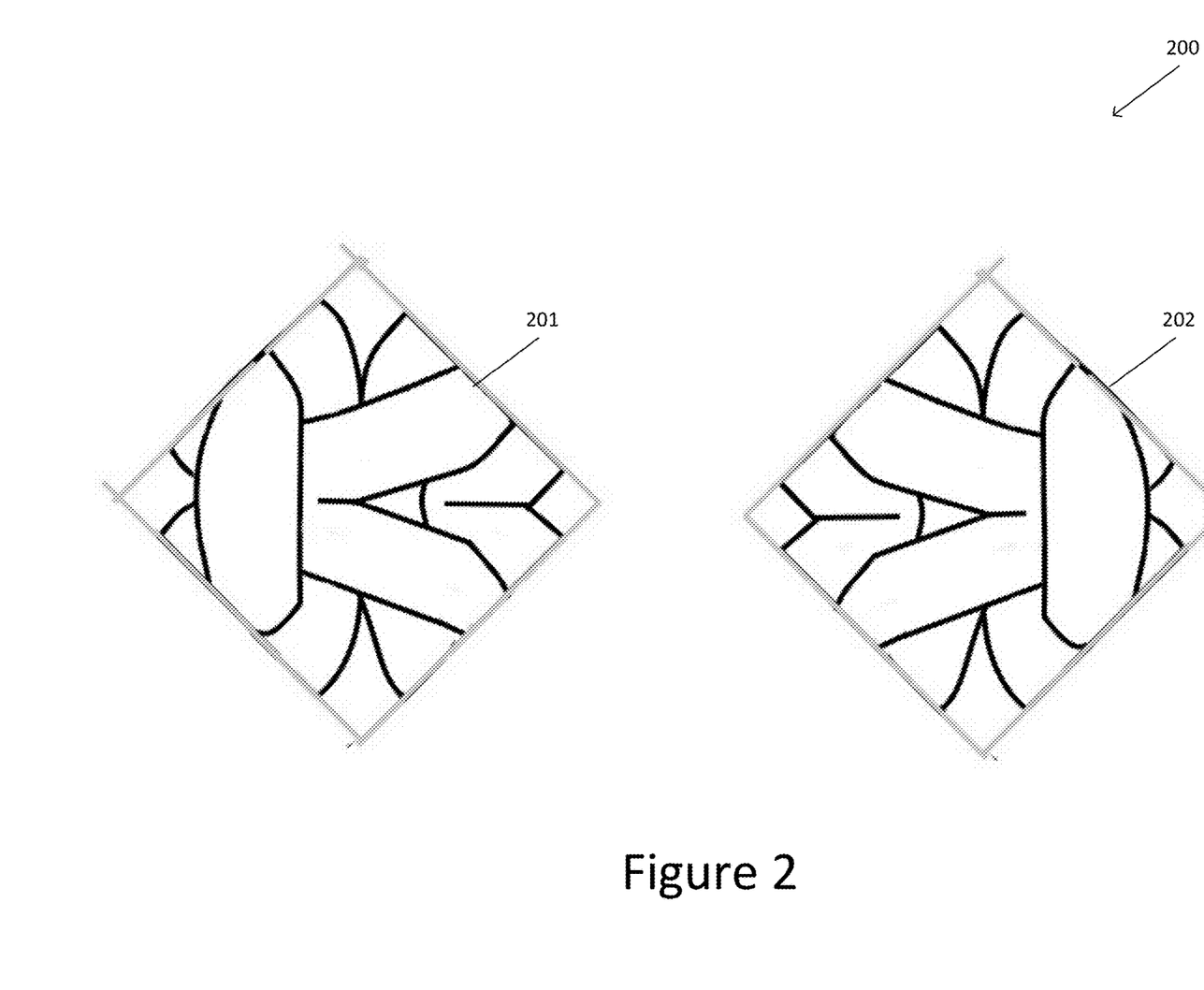
FIG. 2 illustrates a Graphic User Interface (GUI) showing example macramé tiles for use with the macramé app shown in FIG. 1, in accordance with at least one configuration disclosed herein.

With reference to FIG. 2, a GUI 200 is shown that displays "building blocks" or example macramé tiles 201 and 202 that the user 27 has chosen to use to build a macramé project. The macramé tiles 201 and 202 are exemplarily shown as being diamond shaped macramé tiles, however other shapes are possible such as squares, rectangles, trapezoids, triangles, or any other shape that allows macramé tiles to be placed against each other to show a continuation of a cord from one macramé tile to another, to form a macramé project. The macramé tiles 201 and 202 can include metadata that describes how cords enter and exit the macramé tiles 201 and 202, such that the macramé tiles 201 and 202 can only be placed against specific other tiles that have similar meta data such that cords can be continued from one macramé tile to another macramé tile.

As shown in GUIs 300-500, the macramé tiles 201 and 202 can be placed against each other because this meta data allows such placement. The GUI 200 shows that macramé tile 201 includes an example knot in a first orientation and macramé tile 202 includes the same example knot in an "opposed" or vertical mirrored orientation to that shown in macramé tile 201. Also, the particular macramé knots shown in macramé tiles 201 and 202 are for example only, with one skilled in the art understanding that the disclosed macramé tiles are able to visually show any macramé knot imaginable.

FIG. 3 shows a GUI 300 that can be created by the user 27 that includes a plurality of macramé tiles, such as the shown sixteen (16) macramé tiles 212a-212p, although one skilled in the art would understand that the GUI 300 can include more or less macramé tiles than that shown. The user 27, via the macramé app 25, can select and place, e.g., drag-and-drop, preformulated macramé tiles from a menu of preformulated macramé tiles onto an empty page to formulate a macramé project 210. Each of the macramé tiles 212a-212p graphically illustrates on a display of the computing device 20 a knot that can be used to great a macramé pattern, although in other configurations macramé tiles can display portions of knots or even more than one knot. In this example, each of the macramé tiles 212a-212p graphically illustrates use of two knots, with the macramé tiles 212a-212p forming the macramé project 210 having four rows of macramé tiles each using a single type of knot and four columns of macramé tiles. However, as is known to persons making macramé projects a plurality of macramé knots can be used within any single row.

Although the GUI 300 shows the macramé project 210 that is formed from two macramé knots, in other configurations macramé projects can be formed using more or less macramé knots. The GUI 300 further shows interlapping links if beginning colors, shown in the macramé project 210 as being grey in color, are placed at positions 1 and 6, as shown. This grey color can represent any color desired by the user 27, such as blue, red, green, or any other color. The user 27 can select and place a macramé tile, with the macramé app 25 automatically taking an input color(s) and continuing that color(s) through cords of the macramé knots forming the macramé project 210 graphically displayed. The GUI 300 shows numbers that designate cords entering the knots of macramé tiles 212b and 212c. The macramé app 25 provides an option for the user 27 to select a color (any colors) of the cords making up the macramé project 210, to preview how changing one or more colors would ultimately change the look of a final macramé product.

Thus, GUI 300 further shows how the user 27 would physically tie macramé knots to arrive at the macramé project 210, by following the positions 1 and 6 shown in GUI 300. The GUI 300 shows how positioning of cord and various knots change the color pattern of the macramé project 210. As an analogy, this is similar to computer gates: 4 strings in, four out with the type of gate (knot in accordance with the configurations disclosed herein) changing the sequence of the macramé project 210.

FIG. 4 illustrates another GUI showing another macramé project, such as GUI 400 showing macramé project 410, that in at least one configuration can be used as a tapestry, clothing accessory, small jean shorts, bedspread, tablecloth, drapery, plant hanger, or any other project. Of note with macramé project 410 are circled macramé tiles, shown within circles 401 and 402. Should the user 27 want to create a mirror image of the pattern to the left of the macramé tiles shown within circles 401 and 402, the user 27 can select the macramé tiles within circles 401 and 402 and use the macramé app 25 to manipulate, e.g., replace the macramé tiles within circles 401 and 402 so those tiles resemble macramé tile 201. Thereafter, the GUI 400 is updated (not shown) so that a symmetrical pattern is formed with the macramé tiles showing connected grey cords.

FIG. 5 illustrates yet another GUI showing another yet macramé project, such as GUI 500 showing macramé project 510, that in at least one configuration can be used as a tapestry, clothing accessory, small jean shorts, bedspread, tablecloth, drapery, plant hanger, or any other project. Of note with macramé project 510 is that the macramé project 510 is forming using a combination of macramé tiles 201 and 202. With the user 27 selecting and placing a specific macramé tiles within GUI 500, a symmetrical pattern 525 can be formed. Once again, the macramé app 25 automatically takes an input color(s) and continues it/them through the macramé knots forming the macramé project 510 graphically displayed.

Figure 6:
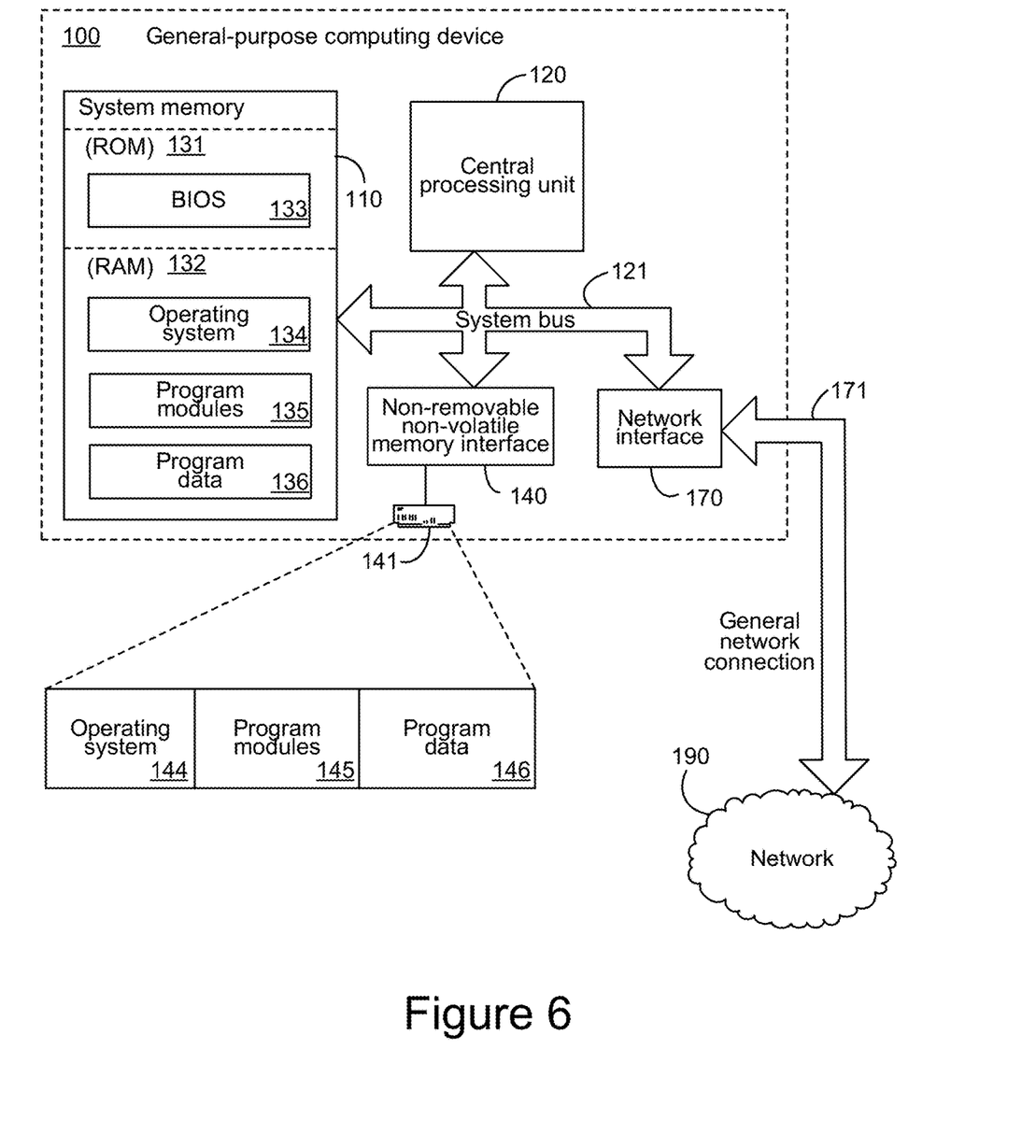
FIG. 6 of the drawings illustrates a schematic representation of an example computing device, in accordance with at least one configuration disclosed herein.

With reference to FIG. 6, an exemplary general-purpose computing device is illustrated in the form of the exemplary general-purpose computing device 100. The general-purpose computing device 100 may be of the type utilized for the computing device 20, devices within the communication network 30 (FIG. 1), the app server 40, as well as the other computing devices with which the computing device 20 may communicate through the communication network 30 (FIG. 1). As such, it will be described with the understanding that variations can be made thereto. The exemplary general-purpose computing device 100 can include, but is not limited to, one or more central processing units (CPUs) 120, a system memory 130, such as including a Read Only Memory (ROM) 731 to store a Basic Input/Output System (BIOS) 733 and a Random Access Memory (RAM) 732, and a system bus 121 that couples various system components including the system memory to the processing unit 120. The CPU 120 generates the GUIs 200-500 and performs the functions of the macramé app 25, as described above. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the general-purpose computing device 100 can be physically co-located, such as on a single chip. In such a case, some or all of the system bus 121 can be nothing more than communicational pathways within a single chip structure and its illustration in FIG. 6 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 6 is a general network connection 171 to the network 190, which can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 6 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 6, provide storage of computer readable instructions, data structures, program modules and other data for the general-purpose computing device 100. In FIG. 6, for example, hard disk drive 141 is illustrated as storing operating system 144, other program modules 145, and program data 146. Note that these components can either be the same as or different from operating system 134, other program modules 135 and program data 136, stored in RAM 132. Operating system 144, other program modules 145 and program data 146 are given different numbers here to illustrate that, at a minimum, they are different copies.

The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as for communications between the computing device 20 and the app server 40 in a timely manner.

The program modules 145 comprises a user interface which can configure devices within the system 10. In many instances, the program modules 145 control a keypad with a display that is connected through a wired connection with the system bus 121. Of course, with the different communication protocols associated with the network interface 170, the program modules 145 may comprise a wireless device that communicates with the computing device 20 through a wireless communication protocol (i.e., Bluetooth, RF, WIFI, etc.). In other embodiments, the program modules 145 may comprise a virtual programming module in the form of software that is on, for example, a smartphone, in communication with the network interface 170. In still other embodiments, such a virtual programming module may be located in the cloud (or web based), with access thereto through any number of different computing devices. Advantageously, with such a configuration, a user may be able to communicate with the app server 40 remotely, with the ability to change functionality.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A computing device comprising:
   a network interface to communicate with an app server and to download a macramé app from the app server; and
   a processing unit to execute the macramé app to select a plurality of macramé tiles and place the plurality of macramé tiles against each other to form a macramé project,
   wherein the plurality of macramé tiles each have a diamond shape defined by a plurality of edges and include a plurality of cords that enter and exit the tiles along the plurality of edges, and a plurality of the plurality of macramé tiles having at least one knot thereon, and
   wherein the macramé tiles each include metadata that describes how cords enter and exit the plurality of macramé tiles.

2. The computing device according to claim 1, where at least one of the plurality of cords is a different color from a rest of the plurality of cords, the macramé app continuing the different color onto the plurality of macramé tiles.

3. The computing device according to claim 2, wherein the macramé app allows a user to select the different color.

4. The computing device according to claim 1, wherein the macramé project is one of a tapestry, clothing accessory, small jean shorts, bedspread, tablecloth, drapery, and plant hanger.

5. The computing device according to claim 1, wherein the macramé app allows a user to replace a macramé tile from the plurality of the macramé tiles within the macramé project.

6. A method comprising:
communicating, by a network interface, with an app server to download a macramé app from the app server; and
executing, by a processing unit, the macramé app to select a plurality of macramé tiles and place the plurality of macramé tiles against each other to form a macramé project,
wherein the plurality of macramé tiles each have a diamond shape defined by a plurality of edges and include a plurality of cords that enter and exit the tiles along the plurality of edges, and a plurality of the plurality of macramé tiles having at least one knot thereon, and
wherein the macramé tiles each include metadata that describes how cords enter and exit the plurality of macramé tiles.

7. The method according to claim 6, wherein at least one of the plurality of cords is a different color from a rest of the plurality of cords, the macramé app continuing the different color onto the plurality of macramé tiles.

8. The method according to claim 7, further comprising allowing, by the macramé app, a user to select the different color.

9. The method according to claim 6, wherein the macramé project is one of a tapestry, clothing accessory, small jean shorts, bedspread, tablecloth, drapery, and plant hanger.

10. The method according to claim 6, further comprising allowing, by the macramé app, a user to replace a macramé tile from the plurality of the macramé tiles within the macramé project.

11. A system comprising:
an app server to store a plurality of apps including a macramé app;
a computing device including a network interface, to communicate with an app server, to download a macramé app from the app server, and a processing unit to execute the macramé app to select a plurality of macramé tiles and place the plurality of macramé tiles against each other to form a macramé project,
wherein the plurality of macramé tiles each have a diamond shape defined by a plurality of edges and include a plurality of cords that enter and exit the tiles along the plurality of edges, and a plurality of the plurality of macramé tiles having at least one knot thereon, and
wherein the macramé tiles each include metadata that describes how cords enter and exit the plurality of macramé tiles.

12. The system according to claim 11, wherein the plurality of macramé tiles include a plurality of cords, where at least one of the plurality of cords being a different color from a rest of the plurality of cords, the macramé app continuing the different color onto the plurality of macramé tiles.

13. The system according to claim 12, wherein the macramé app allows a user to select the different color.

14. The system according to claim 11, wherein the macramé project is one of a tapestry, clothing accessory, small jean shorts, bedspread, tablecloth, drapery, and plant hanger.

15. The system according to claim 11, wherein the macramé app allows a user to replace a macramé tile from the plurality of the macramé tiles within the macramé project.

* * * * *